United States Patent [19]

Williams

[11] Patent Number: 5,933,830
[45] Date of Patent: Aug. 3, 1999

[54] DEVICE AND METHOD FOR ARRANGING DATA FOR USE BY A DATA CLIENT, SUCH AS A GRAPH

[75] Inventor: Neal Wesley Williams, Highland, Utah

[73] Assignee: Corda Technologies, Inc., Orem, Utah

[21] Appl. No.: 08/854,079

[22] Filed: May 9, 1997

[51] Int. Cl.[6] ....................................... G06F 17/30
[52] U.S. Cl. .................... 707/100; 707/101; 707/102; 707/103; 707/104
[58] Field of Search ................... 707/103, 100, 707/101, 102, 104; 711/5

[56] References Cited

U.S. PATENT DOCUMENTS

5,680,615  10/1997  Marlin et al. ........................... 707/103
5,682,524  10/1997  Freund et al. .............................. 711/5

Primary Examiner—Wayne Amsbury
Assistant Examiner—Cheryl Lewis
Attorney, Agent, or Firm—Holland & Hart, LLP

[57] ABSTRACT

An inventive computer-implemented method for arranging one or more sets of data for use by a data client includes automatically determining dimensions of each of the sets of data, automatically adjusting dimensions of a data repository to accommodate the dimensions of the sets of data, and arranging the sets of data in the data repository for use by the data client.

32 Claims, 7 Drawing Sheets

DEVICE AND METHOD FOR ARRANGING DATA FOR USE BY A DATA CLIENT, SUCH AS A GRAPH

TECHNICAL FIELD OF THE INVENTION

This invention relates generally to devices and methods for arranging data, such as tabular data, for use by graphs, gauges, databases, and other data clients. More specifically, this invention relates to devices and methods for automatically arranging data from data sets of varying dimensions for use by data clients, and for filtering data so arranged prior to its use by data clients by, for example, transposing rows and columns of the data, or suppressing selected rows or columns of the data.

BACKGROUND OF THE INVENTION

Figure 1:
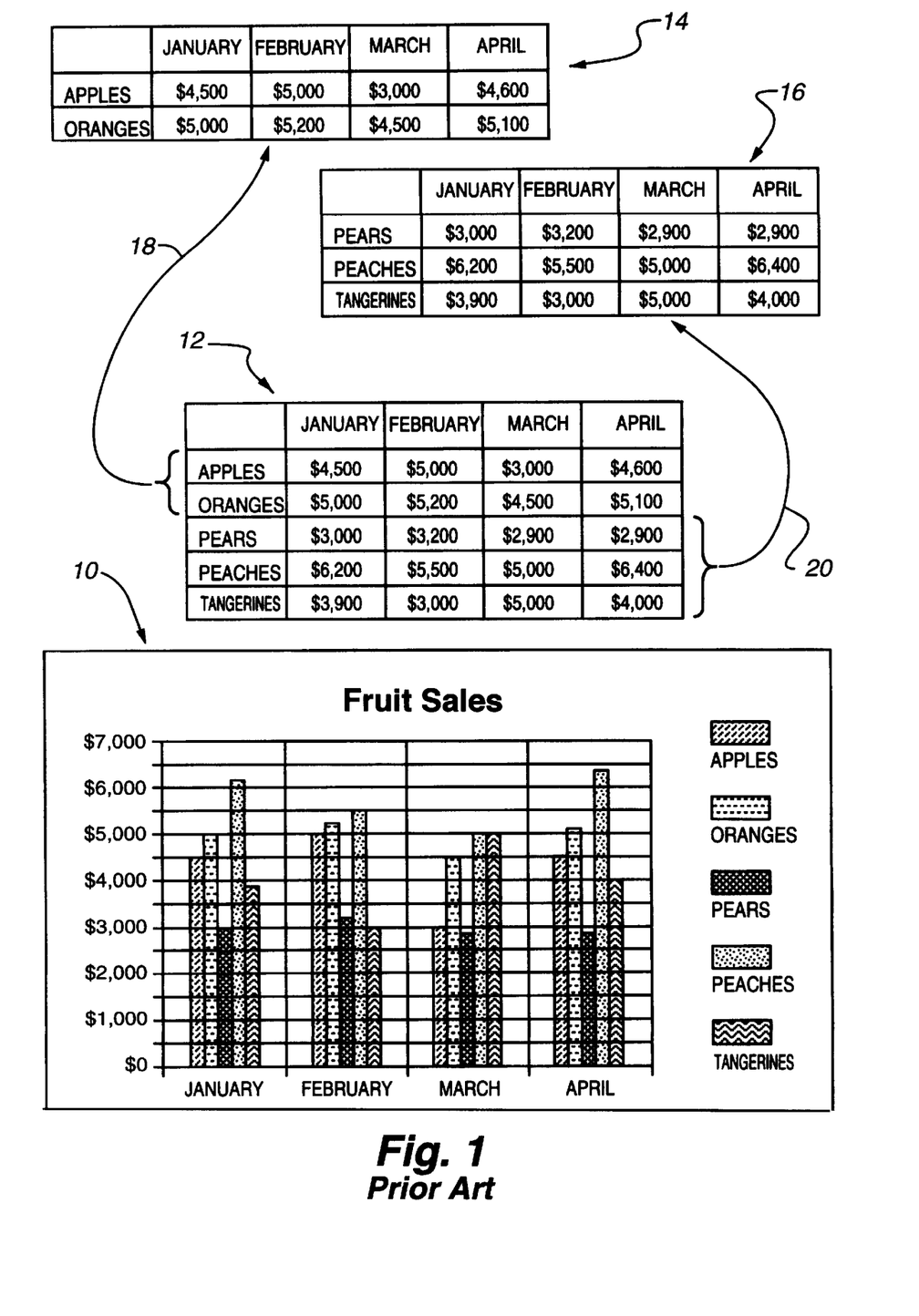
FIG. 1 shows a conventional graph of tabular data from a table linked to other tables.

As shown in FIG. 1, a conventional graph 10 depicts tabular data from a table 12 that is linked to other tables 14 and 16 through Dynamic Data Exchange (DDE) links 18 and 20. The DDE links 18 and 20 act as pointers to the data in the tables 14 and 16 so that the tabular data in the table 12 is updated whenever data in either of the tables 14 and 16 is updated. Thus, for example, if the sales of apples in April were $5,000, rather than the $4,600 shown in FIG. 1, the data in the table 14 can be changed to $5,000, and the corresponding data in the table 12 is automatically updated by the link 18 to reflect the change.

The tables 14 and 16 may reside in separate computer files, or even in separate computers, as long as they are both available to the table 12 through the links 18 and 20. Thus, for example, the table 14 may reside on an apple and orange wholesaler's computer, while the table 16 resides on a pear, peach, and tangerine wholesaler's computer.

DDE links are advantageous because they allow data from separate sources to be combined into a single data set for use by a data client. Thus, for example, sales data in the tables 14 and 16 from different wholesalers are combined in the table 12 for use by the graph 10.

Unfortunately, DDE links can be burdensome to use when the dimensions (e.g., the number of rows and columns) of the data they link to are not static. For example, if a new column of May sales data is added to both of the tables 14 and 16, a new "May" column must be manually added to the table 12 to hold the new data, the links 18 and 20 must be manually revised to link to the new data, and the graph 10 must be manually revised to graph the new data. Similarly, if, for example, the apple and orange wholesaler begins selling watermelons in May, a new "Watermelon" row must be added to the table 12, the link 18 must be revised to link to sales data for the watermelons, and the graph 10 must be revised to include the watermelon sales data. Also, if, for example, the pear, peach, and tangerine wholesaler stops selling tangerines in May so there is no further need to graph tangerine sales data, the "Tangerine" row must be manually deleted from the table 12, or the graph 10 must be manually revised to exclude the tangerine sales data. Thus, DDE links work reasonably well to combine data from separate sources when the dimensions of those sources are static, but require burdensome manual adjustments when the dimensions change, as in the exemplary cases described above.

Similarly, transient data generated "on the fly" by a computer typically cannot be used on the fly by a data client, such as the graph 10, when the dimensions of the transient data may vary over time, because the data client and its links to the transient data must be manually adjusted to accommodate each variance in the dimensions of the transient data. Thus, for example, a web server typically cannot generate a graph on the fly for display on a web site from data generated on the fly on the web server if the dimensions of the data vary each time the data are generated.

Therefore, there is a need in the art for a device and method for arranging data for use by data clients, such as graphs, that overcome these problems. Such a device and method should allow data clients to automatically accommodate changes in the dimensions of data they use.

SUMMARY OF THE INVENTION

An inventive computer-implemented method for arranging one or more sets of data for use by a data client includes automatically determining dimensions of each of the sets of data, automatically adjusting dimensions of a data repository to accommodate the dimensions of the sets of data, and arranging the sets of data in the data repository for use by the data client.

An apparatus for arranging one or more sets of data for use by a data client comprises a data repository device, a source manager device for automatically determining dimensions of each of the sets of data, and a data manager device coupled to the data repository device and the source manager device for automatically adjusting dimensions of the data repository device to accommodate the dimensions of the sets of data and for arranging the sets of data in the data repository device for use by the data client.

An object-oriented system for arranging one or more sets of data for use by a data client is implemented on a computer within an object-oriented framework and comprises a data repository, a source manager object including a member method for determining dimensions of each of the sets of data, and a data manager object including a member method for adjusting dimensions of the data repository to accommodate the dimensions of the sets of data and a member method for arranging the sets of data in the data repository for use by the data client.

A computer system for arranging one or more sets of data for use by a data client comprises an input device, an output device, a memory device, and a processor device coupled to the input, output, and memory devices. One or more of the devices is adapted to automatically determine dimensions of each of the sets of data, to automatically adjust dimensions of a data repository to accommodate the dimensions of the sets of data, and to arrange the sets of data in the data repository for use by the data client.

A computer-readable storage medium has a configuration representing data and instructions for causing a computer to operate in accordance with a method for arranging one or more sets of data for use by a data client. The method comprises determining dimensions of each of the sets of data, adjusting dimensions of a data repository to accommodate the dimensions of the sets of data, and arranging the sets of data in the data repository for use by the data client.

DETAILED DESCRIPTION OF THE ILLUSTRATED EMBODIMENTS

Figure 2:
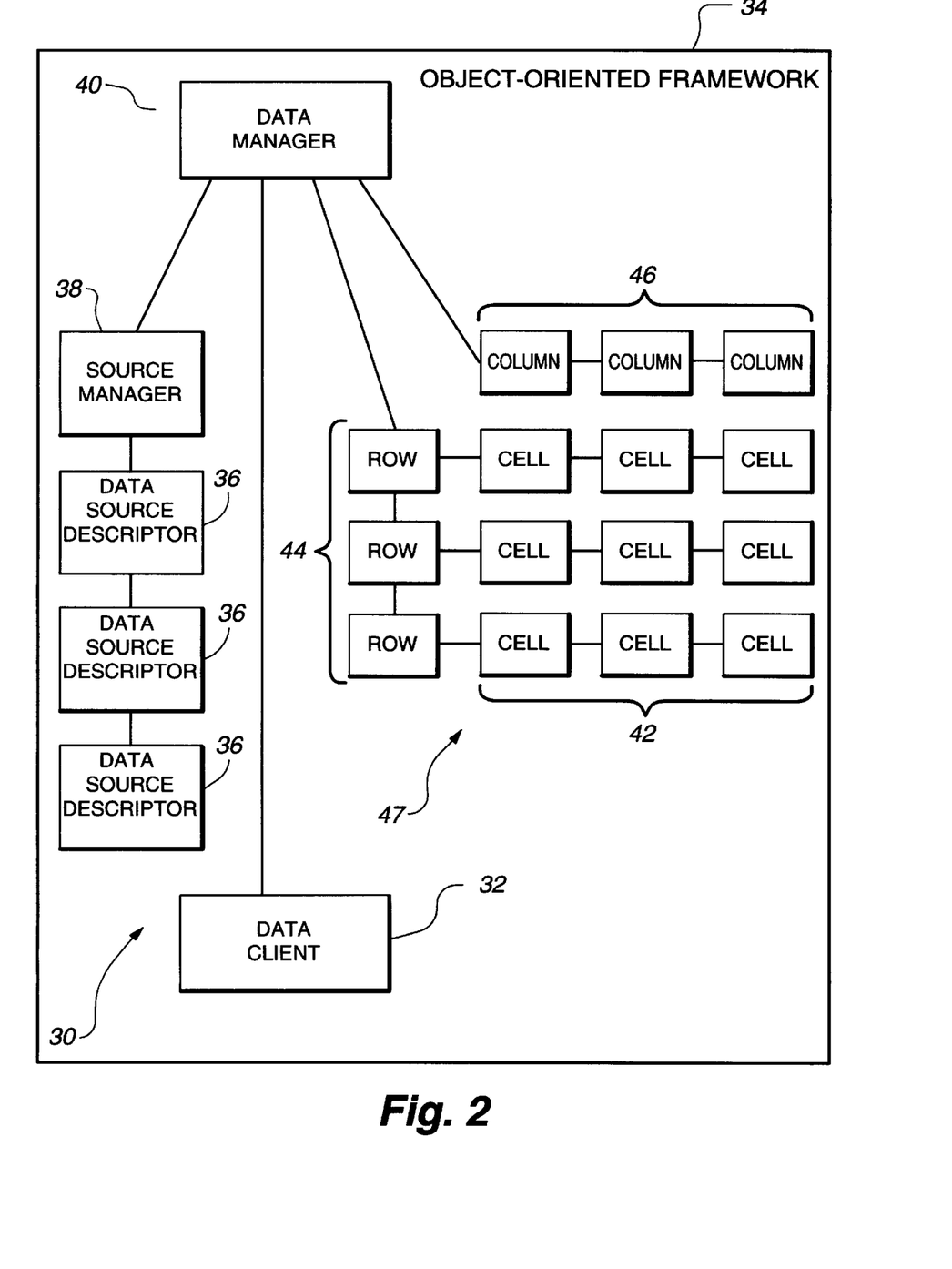
FIG. 2 is a diagram of an object-oriented device for arranging data in accordance with the present invention for use by a data client, such as a graph.

As shown in FIG. 2, an inventive object-oriented device 30 for arranging data for use by a data client 32, such as a graph, a gauge, a table, a spreadsheet, a database, or any other object that illustrates or otherwise uses data, is implemented by a computer system (shown in FIG. 7) within an object-oriented framework 34. The framework 34 provides various services to the device 30, as will be described in more detail below.

Although the present invention will be described with respect to a preferred, object-oriented embodiment, it should be understood by those having skill in the field of this invention that the invention is not limited to object-oriented embodiments. It should also be understood that the invention may be implemented in a wide variety of forms including, for example, a Live Object™ within the OpenDoc™ component software architecture of Apple Technology, Inc. and other companies, an ActiveX™ control as specified by Microsoft Corporation, a Java™ applet as specified by Sun Microsystems Corp., a CORBA-compliant or other software component, and a stand-alone (as opposed to component) application.

Further, it should be understood that, although the present invention will be described in reference to particular objects having certain method members and data members, the present invention is not limited to those particular objects. Rather, the invention includes within its scope embodiments which may combine objects described here as being separate into a single object. For example, it may be desirable to combine certain objects into a single object to enhance the speed with which the present invention executes on certain computer systems, such as a web server.

The device 30 includes a plurality of data source descriptors 36, each of which acts as a reference to an associated set of tabular data (not shown). The data may be any form of data, including both text and numerical data, and may have as its source anything accessible by the device 30 or the framework 34, including, for example, data on the internet, an extranet, or an intranet identified by a Universal Resource Locator (URL) or other identifier, data in a table, database, spreadsheet, or report, or data provided through a link to a Live Object™ or other software component (e.g., the C-Table™ Live Object™ of Corda Technologies, Inc., Assignee of the present invention), an ActiveX™ control, or a Java™ applet. The source of the data may also be an on-the-fly process for generating dynamic data, such as, for example, a Common Gateway Interface (CGI) script executing on a web server in response to a browser "hit" on the server. Also, although the data referenced by the data source descriptors 36 will be described with respect to a preferred embodiment as being tabular data, it will be understood that the present invention is not limited to tabular data.

A source manager 38 responds to queries about the size of the data sets referenced by the data source descriptors 36, as will be described in more detail below with respect to FIG. 3. The source manager 38 also keeps track of the data source descriptors 36, parses data from the data sets referenced by the data source descriptors 36, channels the parsed data to a data manager 40 for storage in cells 42 arranged in rows 44 and columns 46 in a data repository 47 and for use by the data client 32, directs the data manager 40 to insert or delete rows 44 or columns 46 as necessary to adjust for new or deleted rows or columns of data in any of the referenced data sets, or to adjust for new or deleted referenced data sets, and, upon request, makes data referenced by the data source descriptors 36 "static" by breaking the references between the data and the data source descriptors 36. The source manager 38 will be described in more detail below with respect to FIG. 3.

The data manager 40 receives data from the source manager 38, arranges the data in an unfiltered state in the cells 42, delivers the arranged data, upon request, in a filtered state to the data client 32 for its use, and inserts or deletes rows 44 or columns 46, upon request by the source manager 38, to accommodate changes in the dimensions of the data received by the data manager 40 from the source manager 38. In a filtered state, rows and columns of the data may be transposed, the data may be scaled or sorted, and rows, columns, or individual cells of data may be suppressed so they will not be used by the data client 32. The data manager 40 will be described in more detail below with respect to FIG. 4.

The data client 32 receives filtered data from the data manager 40 and formats the data, as needed, for its own use. Of course, it will be understood that a wide variety of data clients will work for purposes of the present invention, including graphs, gauges, spreadsheets, databases, tables, C-Table™ Live Objects™, and any other devices that illustrate or use data.

Figure 3:
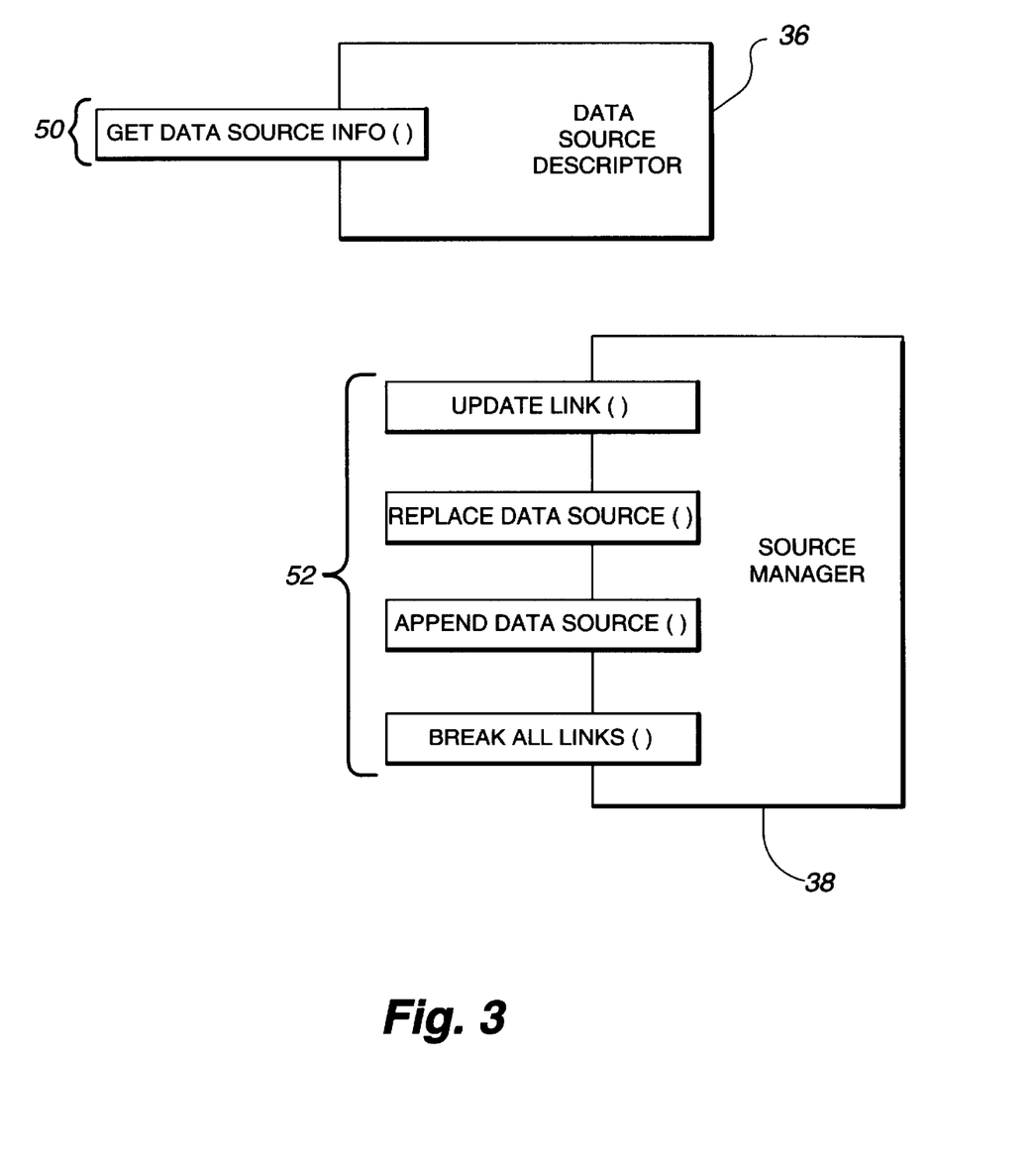
FIG. 3 is a more detailed object diagram of a data source descriptor and source manager of the device of FIG. 2.

As shown in FIG. 3, a data source descriptor 36 includes an interface 50 having a GetDataSourceInfo( ) member method that will be described in more detail below with respect to FIG. 6. The source manager 38 includes an interface 52 having an UpdateLink( ) member method, a ReplaceDataSource( ) member method, an AppendDataSource( ) member method, and a BreakAllLinks( ) member method.

The UpdateLink( ) method is called by the data client 32 (FIG. 2) to update data used by the client 32. The call of the data client 32 may be initiated in a variety of ways, including, for example, a timeout call (e.g., every 10 minutes) from the object-oriented framework 34 (FIG. 2) to the client 32 indicating that a predetermined amount of time has elapsed since the data was last updated, or a notification call from the framework 34 to the client 32 indicating that the data has been changed.

Once the UpdateLink( ) method is called, it calculates the number of rows and columns in the data set referenced by the data source descriptor 36. In order to perform the calculation, data from the referenced data set streams in to the UpdateLink( ) method through an I/O data stream buffer generally in a format in which columns are delimited by tab escape codes (e.g., "\t") and rows are delimited by carriage return or new line escape codes (e.g., "\r" or "\n"). However, it should be understood that a wide variety of formats exist for delimiting rows and columns within a data stream, and that the present invention includes all such formats within its scope. The UpdateLink( ) method then instructs the data manager 40 (FIG. 2) to insert or delete rows 44 or columns 46 (FIG. 2), as necessary, to accommodate the current number of rows and columns in the referenced data set. The manner in which the UpdateLink( ) method instructs the data manager 40 will be described in more detail below with respect to FIG. 4.

When there are enough rows 44 and columns 46 to accommodate the referenced data set, the UpdateLink( ) method parses data from the referenced data set that streams into the source manager 38 through the I/O data stream buffer, and then channels the parsed data to the data manager 40 for storage in the cells 42 (FIG. 2) in a manner that will be described in more detail below with respect to FIGS. 4 and 5.

The ReplaceDataSource( ) method of the source manager 38 is called by the data client 32 to replace a data set used by the client 32 with a new data set. Again, the call of the data client 32 may be initiated in a variety of ways, including, for example, a paste call from the framework 34 to the client 32 indicating that the new data set is to be pasted into the client 32 using a replace-type paste.

Once the ReplaceDataSource( ) method is called, it calculates the number of rows and columns in the new data set referenced by the descriptor 36. In order to perform the calculation, data from the referenced data set streams in to the ReplaceDataSource( ) method through an I/O data stream buffer. The ReplaceDataSource( ) method then instructs the data manager 40 to purge all existing cells 42 in a manner which will be described in more detail below with respect to FIG. 4. When the existing cells 42 are purged, the ReplaceDataSource( ) method parses data from the new data set that streams into the source manager 38 through the I/O data stream buffer, and then channels the parsed data to the data manager 40 for storage in cells 42 in a manner that will be described in more detail below with respect to FIGS. 4 and 5.

The AppendDataSource( ) method of the source manager 38 is called by the data client 32 to append a new data set for use by the client 32 to those data sets already used by the client 32. This call of the data client 32 also may be initiated in a variety of ways, including, for example, a paste call from the framework 34 to the client 32 indicating that the new data set is to be pasted into the client 32 using an append-type paste.

Once the AppendDataSource( ) method is called, it calculates the number of rows and columns in the new data set referenced by the descriptor 36. In order to perform the calculation, data from the referenced data set streams in to the AppendDataSource( ) method through an I/O data stream buffer. The AppendDataSource( ) method then parses the streaming data, and channels the parsed data to the data manager 40 for storage in the cells 42 in a manner that will be described in more detail below with respect to FIGS. 4 and 5.

The BreakAllLinks( ) method of the source manager 38 is called by the data client 32 to make all data used by the client 32 static by severing all references or links between the data and the data sets from which it came. Such a call by the data client 32 may be initiated, for example, by a user command within the client 32 to make the data used by the client 32 static.

Figure 4:
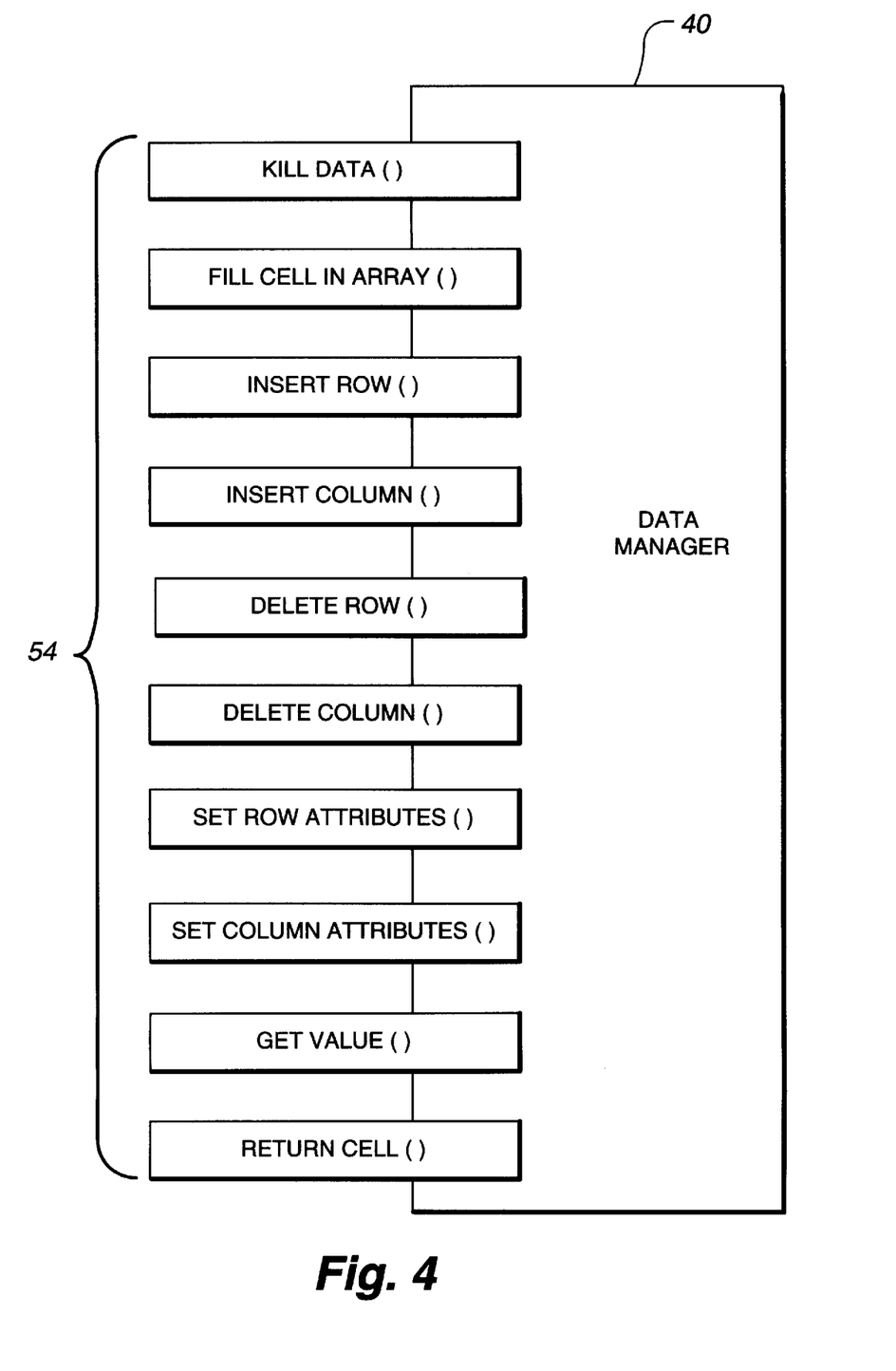
FIG. 4 is a more detailed object diagram of a data manager of the device of FIG. 2.

As shown in FIG. 4, the data manager 40 includes an interface 54 having a KillData( ) member method that is called by the ReplaceDataSource( ) method of the source manager 38 (FIG. 3) to purge all existing cells 42 (FIG. 2). The interface 54 also has a FillCellInArray( ) member method that is called by the UpdateLink( ), ReplaceDataSource( ), and AppendDataSource( ) methods of the source manager 38 to fill cells 42 with data channeled to the data manager 40 by the source manager 38. When called, the FillCellArray( ) method creates additional rows 44 or columns 46 (FIG. 2), as necessary, to accommodate the data channeled to the data manager 40. The FillCellArray( ) method then directs the rows 44 to fill the cells 42 with the channeled data in a manner that will be described in more detail below with respect to FIG. 5.

InsertRow( ), InsertColumn( ), DeleteRow( ), and DeleteColumn( ) member methods of the data manager interface 54 may be called by the UpdateLink( ) method of the source manager 38 to insert or delete rows 44 or columns 46, as necessary, to accommodate the current number of rows and columns in the data to be transferred to the data manager 40. A GetValue( ) member method is called by the data client 32 to retrieve a value from one of the cells 42 for use by the client 32. The value is retrieved through one of the rows 44 in a manner that will be described in more detail below with respect to FIG. 5. SetRowAttributes( ), SetColumnAttributes( ), and ReturnCell( ) member methods of the data manager interface 54 will be described in detail below with respect to FIG. 6.

Figure 5:
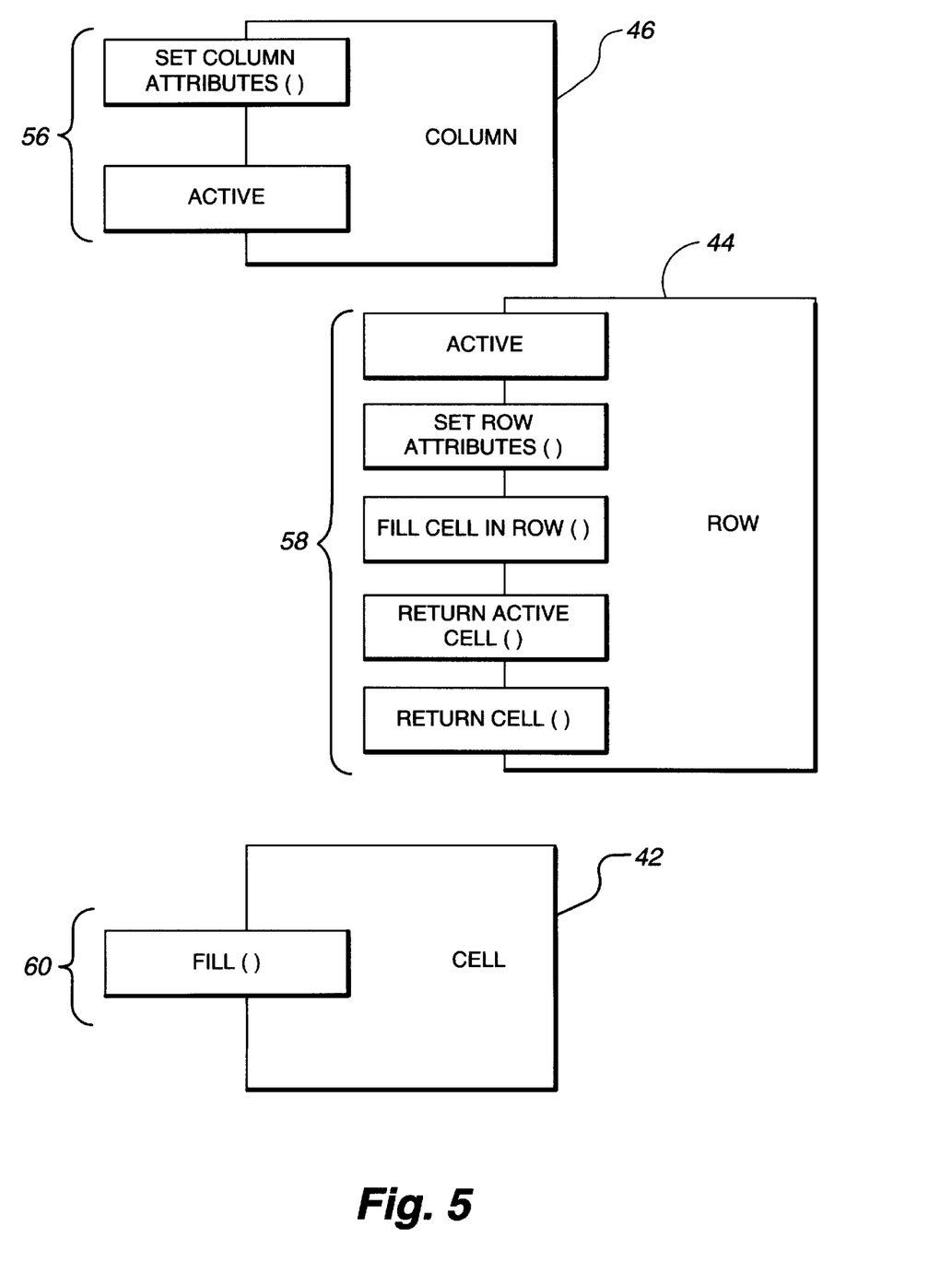
FIG. 5 is a more detailed object diagram of a column, row, and cell of the device of FIG. 2.

As shown in FIG. 5, a column 46 includes an interface 56 having an Active data member and a SetColumnAttributes( ) member method, both of which will be described in more detail below with respect to FIG. 6.

A row 44 includes an interface 58 having FillCellInRow( ) and ReturnActiveCell( ) member methods. The FillCellInRow( ) method is called by the FillCellInArray( ) method of the data manager interface 54 (FIG. 4) to fill cells 42 in the row 44 with data. The FillCellInRow( ) method inserts additional cells 42, if necessary, to accommodate the data, and then directs one of the cells 42 to store some of the data by calling a Fill( ) member method of a cell interface 60. SetRowAttributes( ) and ReturnCell( ) member methods of the row interface 58, as well as an Active data member, will be described in more detail below with respect to FIG. 6.

Figure 6:
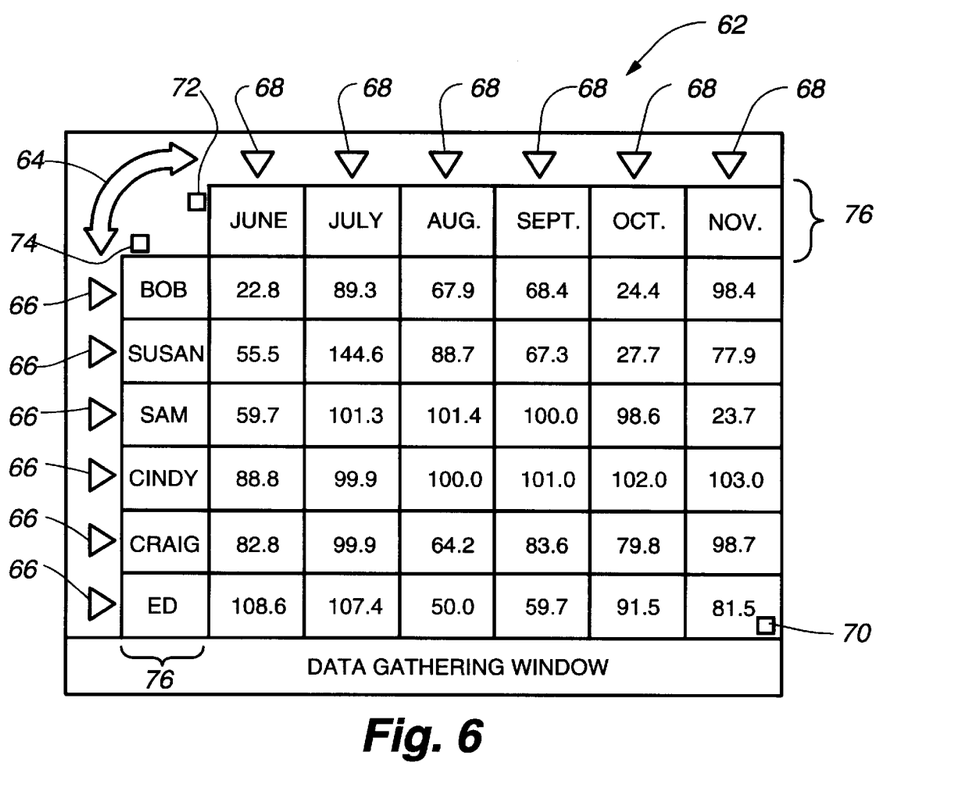
FIG. 6 is an illustration of a data gathering window in accordance with the present invention that can filter data for use by a data client by transposing or suppressing rows and columns of the data.

As shown in FIG. 6, a data gathering window 62 calls the ReturnCell( ) method of the data manager 40 (FIG. 4), which in turn calls the ReturnCell( ) method of the row 44 (FIG. 5), to retrieve data from the cells 42 (FIG. 2) for display in the window 62. Of course, it should be understood that the cells 42 depicted in FIG. 2 are only representative, and thus do not necessarily depict the number of cells 42 necessary to provide the quantity of data shown in FIG. 6. The window 62 also calls the GetDataSourceInfo( ) method of the data source descriptor 36 (FIG. 3) to retrieve information necessary to properly display the data in the window 62, such as information regarding the sources of the data (e.g., URL or link), and information about where in the data gathering window the data should be displayed.

The window 62 includes controls for filtering the data so that the data client 32 (FIG. 2) accesses the filtered data when it calls the GetValue( ) method of the data manager interface 54 (FIG. 4). For example, a transpose control 64 can transpose the data extending along the vertical axis (category data) and the data extending along the horizontal axis (series data). In addition, row and column suppression controls 66 and 68 can designate selected rows or columns of data as being inactive, and such inactive data will not be accessed by the data client 32 through the GetValue( ) method. Also, cell suppression controls 70 (only one control 70 is shown in FIG. 6) can suppress individual cells of data. Further, controls for sorting 72 and scaling 74 selected data are provided.

When selected rows or columns are suppressed, the data gathering window 62 calls the SetRowAttributes( ) or SetColumnAttributes( ) methods of the data manager interface 54 (FIG. 4), which in turn call the SetRowAttributes( ) or SetColumnAttributes( ) methods of the column 46 (FIG. 5) or row 44 (FIG. 5), to set the Active data member of the selected row 44 or column 46 as false. As a result, the GetValue( ) method of the data manager interface 54 may access the Active data members of the row 44 or column 46 and determine that it should not return a suppressed row 44 or column 46 to the data client 32 (FIG. 2) when called, but, rather, should return an active row 44 or column 46.

The data gathering window 62 also includes areas 76 for convenient manual entry of row and column labels. Such labels are passed through the data manager 40 (FIG. 2) to the data client 32 (FIG. 2) for depiction or other use by the client 32.

Figure 7:
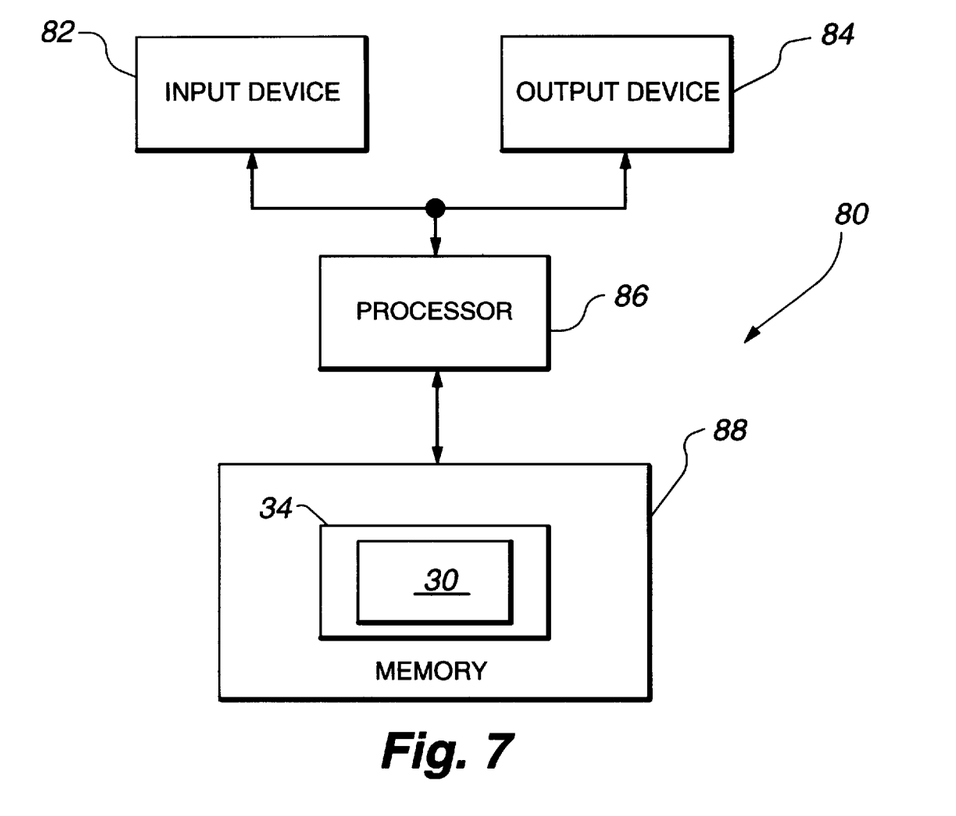
FIG. 7 is a block diagram of a computer system incorporating the device of FIG. 2 in an object-oriented framework of FIG. 2.
Figure 8:
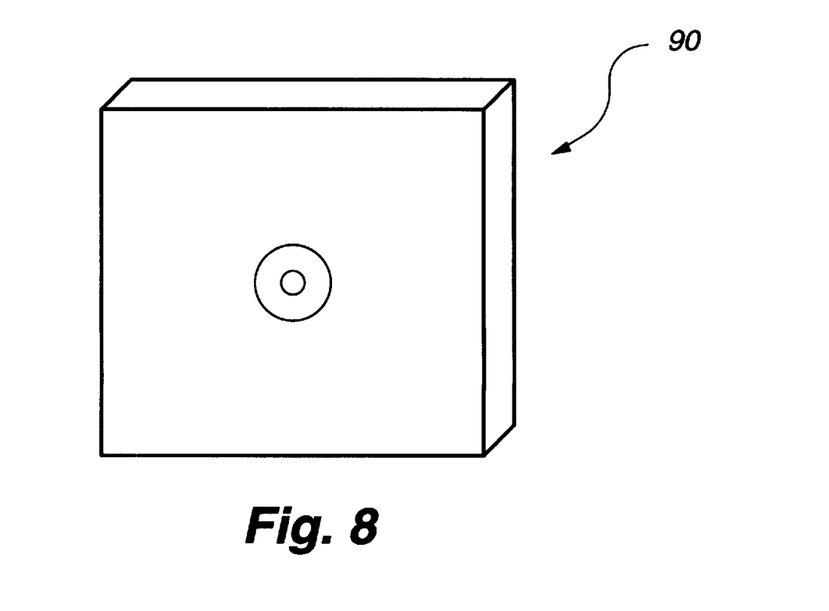
FIG. 8 is a generic diagram of a computer-readable storage medium, such as a diskette, upon which is stored a program incorporating methods of the present invention.

As shown in FIG. 7, a computer system 80 incorporating the device 30 and object-oriented framework 34 of FIG. 2 includes an input device 82, an output device 84, such as a display, a processor 86, and a memory 88. As shown in FIG. 8, a program incorporating the device 30 (not shown in FIG. 8) may be stored on a computer-readable storage medium 90, such as a diskette, floppy disk, CD-ROM, hard disk, tape, or other suitable media.

The present invention thus provides devices and methods for arranging data for use by data clients, such as graphs, that overcome the problems described earlier. In particular, the devices and methods allow data clients to automatically accommodate changes in the dimensions of data they use. This can be particularly useful, for example, in implementing a browser "hit" count for an internet web page that may be accessed and displayed on the web page as a graph. In this example application of the present invention, a count of browser "hits" on a web page over time may be kept on a web server. When a user "clicks" on a selected link on the web page, a graph is created which shows the hits over time in a graphical format. Because the present invention allows the graph to automatically accommodate data as it is added over time, little or no maintenance of the graph and its underlying programming is required.

It should be understood that a wide variety of desirable modifications are possible to the present invention. For example, although the present invention has generally been described as being applicable to arranging two-dimensional tabular data, it should be understood that the invention is equally applicable to arranging data of three or more dimensions, and to displaying data in three-dimensional, as well as two-dimensional, graphs. Also, the present invention has been described as having only a one-way data flow from the data sets and source manager, through the data manager, to the cells and data client, but the invention is not so limited. Rather, the present invention includes within its scope those applications in which data entered into a data gathering window, for example, or data entered directly into a data client, is channeled back to the appropriate data set through the data manager and source manager to change the relevant data value in the appropriate data set.

Although the present invention has been described with reference to particular embodiments, the invention is not limited to these embodiments. For example, while the various steps of these embodiments have been described as occurring in a particular order, it will be understood that these steps need not necessarily occur in the described order to fall within the scope of the present invention. Thus, the invention is limited only by the appended claims, which include within their scope all equivalent devices and methods that operate according to the principles of the invention as described.

I claim:

1. A computer-implemented method for arranging one or more sets of data for use by a data client, the method comprising:

providing a data repository having one or more data cells;

automatically determining dimensions of each of the sets of data;

automatically adjusting the number of data cells in the data repository to accommodate the dimensions of the sets of data; and arranging the sets of data in the data repository for use by the data client.

2. The method of claim 1 wherein the step of automatically determining dimensions of each of the sets of data comprises receiving each of the sets of data in a row and column-delimited format and determining the number of rows and columns in each of the sets of data from the row and column-delimited format of each set.

3. The method of claim 2 wherein the step of receiving each of the sets of data in a row and column-delimited format comprises receiving each of the sets of data in a format in which columns are delimited by tab escape codes and rows are delimited by at least one of carriage return escape codes and new line escape codes.

4. The method of claim 1 wherein the data repository and the sets of data are arranged in rows and columns, wherein the step of automatically adjusting the number of data cells in the data repository to accommodate the dimensions of the sets of data comprises:

adding rows to the data repository when the total number of rows in the sets of data is greater than the number of rows in the data repository;

adding columns to the data repository when the total number of columns in the sets of data is greater than the number of columns in the data repository;

deleting rows from the data repository when the total number of rows in the sets of data is less than the number of rows in the data repository; and deleting columns from the data repository when the total number of columns in the sets of data is less than the number of columns in the data repository.

5. The method of claim 1 wherein the data repository and the sets of data are arranged in rows and columns, wherein the step of arranging the sets of data in the data repository for use by the data client comprises parsing each of the sets of data into rows and columns and storing the parsed sets of data in the rows and columns of the data repository.

6. The method of claim 1 wherein the step of arranging the sets of data in the data repository for use by the data client includes filtering the sets of data for use by the data client.

7. The method of claim 6 wherein the step of filtering the sets of data includes at least one of:

transposing rows and columns in the sets of data;

suppressing at least one of rows, columns, and cells in the sets of data;

scaling sets of data; and sorting sets of data.

8. The method of claim 1 wherein the sets of data include at least one of text data and numerical data.

9. The method of claim 1, further comprising modifying the sets of data through their use by the data client.

10. The method of claim 1 wherein the steps of determining, adjusting, and arranging occur sequentially.

11. An apparatus for arranging one or more sets of data for use by a data client, the apparatus comprising:
- a data repository device having one or more data cells;
- a source manager device for automatically determining dimensions of each of the sets of data; and
- a data manager device coupled to the data repository device and the source manager device for automatically adjusting the number of data cells in the data repository device to accommodate the dimensions of the sets of data and for arranging the sets of data in the data repository device for use by the data client.

12. The apparatus of claim 11 wherein the data cells of the data repository device are arranged in rows and columns.

13. The apparatus of claim 11 wherein at least one of the data repository, source manager, and data manager devices is implemented on at least one computer within an object-oriented framework and includes at least one object.

14. The apparatus of claim 11 wherein the source manager device comprises a device for receiving each of the sets of data in a row and column-delimited format and for determining the number of rows and columns in each of the sets of data from the row and column-delimited format of each set.

15. The apparatus of claim 14 wherein the source manager device comprises a device for receiving each of the sets of data in a format in which columns are delimited by tab escape codes and rows are delimited by at least one of carriage return escape codes and new line escape codes.

16. The apparatus of claim 11 wherein the sets of data are arranged in rows and columns, wherein the data repository device comprises a plurality of cells arranged in rows and columns, wherein the data manager device comprises a device for:
- adding rows of cells to the data repository device when the total number of rows in the sets of data is greater than the number of rows of cells in the data repository device;
- adding columns of cells to the data repository device when the total number of columns in the sets of data is greater than the number of columns of cells in the data repository device;
- deleting rows of cells from the data repository device when the total number of rows in the sets of data is less than the number of rows of cells in the data repository device;
- deleting columns of cells from the data repository device when the total number of columns in the sets of data is less than the number of columns of cells in the data repository device;
- parsing each of the sets of data into rows and columns; and
- storing the parsed sets of data in the rows and columns of cells in the data repository device.

17. The apparatus of claim 11 wherein the data repository, source manager, and data manager devices are all implemented in a single computer.

18. The apparatus of claim 11 wherein the source manager device comprises a plurality of source manager objects each associated with one of the sets of data.

19. The apparatus of claim 11, further comprising a data gathering window device coupled to the data manager device for filtering the sets of data in the data repository for use by the data client.

20. The apparatus of claim 17 wherein the data gathering window device includes devices for transposing rows and columns of data in the sets of data in the data repository, suppressing rows, columns, and cells of data in the sets of data in the data repository, scaling data in the sets of data in the data repository, and sorting data in the sets of data in the data repository.

21. The apparatus of claim 19 wherein the data gathering window device includes devices for manual entry of row and column labels on the sets of data in the data repository for use by the data client.

22. An object-oriented system for arranging one or more sets of data for use by a data client, the system being for implementation on a computer within an object-oriented framework, the system comprising:
- a data repository having one or more data cells;
- a source manager object including a member method for determining dimensions of each of the sets of data; and
- a data manager object including a member method for adjusting the number of data cells in the data repository to accommodate the dimensions of the sets of data and a member method for arranging the sets of data in the data repository for use by the data client.

23. The system of claim 11 wherein the source manager object further includes member methods for:
- causing the data manager object to adjust the number of data cells in the data repository;
- parsing data;
- providing parsed data to the data manager object for arrangement in the data repository; and
- causing the data manager object to purge the data repository of data.

24. The system of claim 11 wherein the data manager object further includes member methods for:
- purging the data repository of data; and
- retrieving data from the data repository.

25. A computer system for arranging one or more sets of data for use by a data client, the computer system comprising an input device, an output device, a memory device, and a processor device coupled to the input, output, and memory devices, one or more of the devices being adapted to automatically determine dimensions of each of the sets of data, to automatically adjust the number of data cells in a data repository to accommodate the dimensions of the sets of data, and to arrange the sets of data in the data repository for use by the data client.

26. A computer-readable storage medium having a configuration representing data and instructions for causing a computer to operate in accordance with a method for arranging one or more sets of data for use by a data client, the method comprising:
- determining dimensions of each of the sets of data;
- adjusting the number of data cells in a data repository to accommodate the dimensions of the sets of data; and
- arranging the sets of data in the data repository for use by the data client.

27. A computer-implemented method for arranging one or more sets of data, the method comprising:
- automatically determining dimensions of each of the sets of data;
- automatically adjusting dimensions of a data repository to accommodate the dimensions of the sets of data; and
- arranging the sets of data in the data repository for use by a data client selected from a group comprising a graph, a gauge, a database, a table, a spreadsheet, a software component, a stand-alone software application, a Live Object, an ActiveX control, and a Java applet.

28. A computer-implemented method for arranging one or more sets of data for use by a data client, the method comprising:

automatically determining dimensions of each of the sets of data, including accessing each of the sets of data from a source selected from a group comprising an internet, an extranet, an intranet, a table, a database, a spreadsheet, a report, a Live Object, a software component, an ActiveX control, a Java applet, and a Common Gateway Interface (CGI) script executing on a computer;

automatically adjusting dimensions of a data repository to accommodate the dimensions of the sets of data; and arranging the sets of data in the data repository for use by the data client.

29. An object-oriented system for arranging one or more sets of data for use by a data client, the system being for implementation on a computer within an object-oriented framework that includes an OpenDoc framework, the system comprising:

a data repository;

a source manager object including a member method for determining dimensions of each of the sets of data; and a data manager object including a member method for adjusting dimensions of the data repository to accommodate the dimensions of the sets of data and a member method for arranging the sets of data in the data repository for use by the data client.

30. An object-oriented system for arranging one or more sets of data for use by a data client, the system being for implementation on a computer within an object-oriented framework, the system comprising:

a data repository;

a source manager object including a member method for determining dimensions of each of the sets of data, the source manager object being responsive to at least one of timeout calls, notification calls, and paste calls from the object-oriented framework; and a data manager object including a member method for adjusting dimensions of the data repository to accommodate the dimensions of the sets of data and a member method for arranging the sets of data in the data repository for use by the data client.

31. An object-oriented system for arranging one or more sets of data for use by a data client, the system being for implementation on a computer within an object-oriented framework, the system comprising:

a data repository;

a source manager object including a member method for determining dimensions of each of the sets of data; and a data manager object including a member method for adjusting dimensions of the data repository to accommodate the dimensions of the sets of data, a member method for arranging the sets of data in the data repository for use by the data client, a member method for purging the data repository of data, and a member method for retrieving data from the data repository that includes methods for retrieving both filtered and unfiltered data from the data repository.

32. A computer readable storage medium selected from a group comprising a diskette, a floppy disk, a CD-ROM, a hard disk, and a tape, the medium having a configuration representing data and instructions for causing a computer to operate in accordance with a method for arranging one or more sets of data for use by a data client, the method comprising:

determining dimensions of each of the sets of data;

adjusting dimensions of a data repository to accommodate the dimensions of the sets of data; and arranging the sets of data in the data repository for use by the data client.

* * * * *